United States Patent [19]
Brown

[11] Patent Number: 6,047,866
[45] Date of Patent: Apr. 11, 2000

[54] PORTABLE LIQUID DISPENSER

[76] Inventor: Jack C. Brown, P.O. Box 916287, Longwood, Fla. 32779

[21] Appl. No.: 09/093,198

[22] Filed: Jun. 8, 1998

[51] Int. Cl.$^7$ ........................................................ B67D 3/00
[52] U.S. Cl. ........................... 222/608; 222/609; 222/610; 222/527; 222/528; 222/481; 222/482; 222/506; 222/545; 280/47.26; 280/47.29
[58] Field of Search ............................... 280/47.19, 47.26, 280/47.29, 655; 222/481, 482, 506, 538, 545, 529, 530, 527, 528, 608, 609, 610

[56] References Cited

U.S. PATENT DOCUMENTS

| | | |
|---|---|---|
| D. 321,980 | 12/1991 | Billet . |
| 3,286,884 | 11/1966 | Long, Jr. . |
| 4,546,900 | 10/1985 | Lackey . |
| 4,865,346 | 9/1989 | Carlile ...................................... 280/655 |
| 4,869,402 | 9/1989 | Ash, Jr. . |
| 5,090,214 | 2/1992 | LoGioco . |
| 5,154,317 | 10/1992 | Roppolo, III ........................... 222/608 |
| 5,433,085 | 7/1995 | Rogers . |
| 5,469,708 | 11/1995 | Harrison et al. . |
| 5,626,352 | 5/1997 | Grace ..................................... 280/47.29 |
| 5,638,991 | 6/1997 | Todden et al. ........................... 222/608 |
| 5,758,886 | 6/1998 | Mayer .................................... 280/47.26 |
| 5,921,445 | 7/1999 | Schmitz et al. .......................... 222/385 |

*Primary Examiner*—Kevin Shaver
*Assistant Examiner*—David Deal
*Attorney, Agent, or Firm*—William M. Hobby, III

[57] ABSTRACT

A portable liquid dispenser apparatus has an insulated liquid container having a plurality of flexible dispensing tubes extending from the container. Each of the plurality of flexible dispensing tubes has a nozzle and valve on the end thereof for selectively dispensing liquid from the container. A wheeled container cart has two container supports thereon and has the liquid container removably mounted in a raised position for gravity dispensing of the liquid from the container to one or more individuals through each of the flexible tubes. The wheeled container cart can include a pair supporting surfaces for supporting two liquid containers. The insulated liquid container can have a generally rigid manifold attached to the outside of the container and connected to the inside of the container for receiving the liquid from the inside of the container and dispensing the liquid from the plurality of flexible tubes connected to the manifold. The rigid manifold having the flexible tubes attached thereto can be removably attached to the insulated liquid container for switching between containers.

11 Claims, 3 Drawing Sheets

PORTABLE LIQUID DISPENSER

BACKGROUND OF THE INVENTION

The present invention relates to a portable liquid dispenser and especially to a liquid dispenser mounted to a wheeled cart and having a plurality of dispensing tubes individually activated.

It is common at many events, work sites, and especially sporting events of all types, to provide liquid beverages to the participants in the sport. The beverages are commonly provided in small containers kept in an insulated cooler or sometimes directly from an insulated container holding a liquid, such as water or other beverage. Beverage coolers frequently have a dispensing spout for dispensing into cups or containers for use by an individual athlete or workman. These prior portable liquid dispensers have the disadvantage that they weigh a lot as a result of the liquids being carried in the container and at each event, a location must be found to set the container on the ground or on a raised level so that different workman, athletes or the like can have access to the dispenser for obtaining the liquid beverage therefrom. A liquid dispenser must also provide throw-away cups and a provision for collecting the used cups and trash or must use a common cup. Very typically, a beverage dispenser allows for dispensing only to one user at a time which delays the number of people dispensing liquids simultaneously.

It has been suggested in the past to provide portable beverage dispensers, such as seen in the U.S. Patent to L. S. Long, Jr., U.S. Pat. No. 3,286,884, for a portable insulated beverage dispenser supported upon the shoulders and back of a vender for dispensing liquid out a flexible tube through a valved nozzle and in the U.S. Des. Pat. No. to Billet, No. D 321,980, for a portable beverage dispenser. Another portable beverage dispenser can be seen in the U.S. patent to Ash, Jr., U.S. Pat. No. 4,869,402, for a portable beverage dispenser having a rigid dispenser tank with an inflatable gas bladder with pressurized air to maintain the liquid beverage under pressure. In the U.S. Patent to LoGioco, U.S. Pat. No. 5,090,214, a spray mate cooler has a portable ice chest with a removable lid and has a mechanism in the bottom of the container for elevating the ice to permit cold water from the melted ice to collect on the bottom. It also has a mechanism for spraying the cold water collected on the bottom through a sidewall of the container. In the U.S. Patent to Lackey, U.S. Pat. No. 4,546,900, a container having an internal liner dispenses through a valve tube out of the bottom of the container. In the U.S. Patent to Rogers, U.S. Pat. No. 5,433,085, a chilled beverage display container is illustrated while in the Harrison et al. patent, U.S. Pat. No. 5,469,708, a water cooler is disclosed which is mounted in a raised position within a refrigerator for dispensing a liquid therefrom.

In contrast to these prior art devices, the present invention is directed towards an insulated liquid cooler which can be wheeled to an athletic contest or to a work site and held in a raised position with a plurality of dispensing tubes each separately valved to allow a plurality of athletes or workers or the like to dispense a liquid directly into their mouths. The wheeled container can also support two containers and allows one to telescope into a raised positioned.

SUMMARY OF THE INVENTION

A portable liquid dispenser apparatus has an insulated liquid container having a plurality of flexible dispensing tubes extending from the container. Each of the plurality of flexible dispensing tubes has a nozzle and valve on the end thereof for selectively dispensing liquid from the container. A wheeled container cart has two container supports thereon and has the liquid container removably mounted in a raised position for gravity dispensing of the liquid from the container to one or more individuals through each of the flexible tubes. The insulated liquid container can have a generally rigid curved tube or manifold attached to the outside of the container and connected to the inside of the container for receiving the liquid from the inside of the container and dispensing the liquid from the plurality of flexible tubes connected to the curved rigid tube. The curved rigid manifold has the flexible tubes attached thereto can be removably attached to the insulated liquid container for switching between containers.

BRIEF DESCRIPTION OF THE DRAWINGS

Other objects, features, and advantages of the present invention will be apparent from the written description and the drawings in which.

DESCRIPTION OF THE PREFERRED EMBODIMENT

Figure 1:
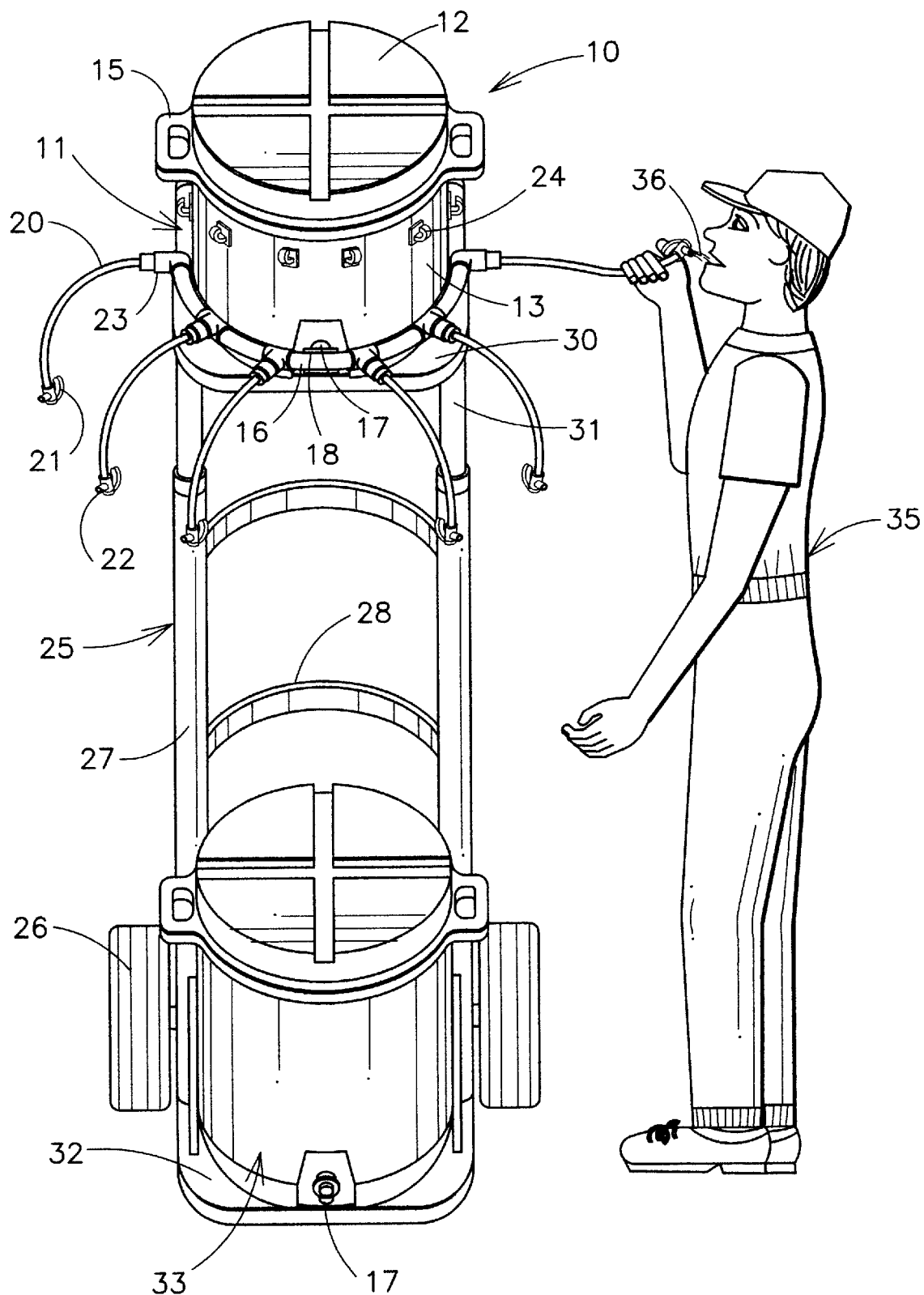
FIG. 1 is a perspective view of the portable liquid dispenser of the present invention.

Referring to the drawings, FIGS. 1 through 5, and especially to FIG. 1, a portable beverage dispenser apparatus 10 has an insulated liquid container 11 having a top 12 covering an open top of the container 11 and having sides 13 and a bottom 14. The container 11 has a pair of handles 15 for supporting the container and has a generally rigid and curved tube or manifold 16 mounted to the outside wall 15 of the container 11. The container 11 has an opening 17 through the walls 13 with a protruding spout 18 connected to the opening 17 for connection to the manifold 16. The tube 16 has a plurality of flexible tubes 20 each having a valve 21 and nozzle 22 mounted to the end thereof. The valve 21 and nozzle 22 can be a combination valve and nozzle attached to the end of each tube. Each tube is connected with a coupling 23 to the manifold 16. The side 13 of the insulated container 11 has a plurality of hooks 24 attached thereto, one for each flexible hose 20 or valve 21 and nozzle 22 thereon for holding the valves and nozzles in a raised position.

Figure 4:
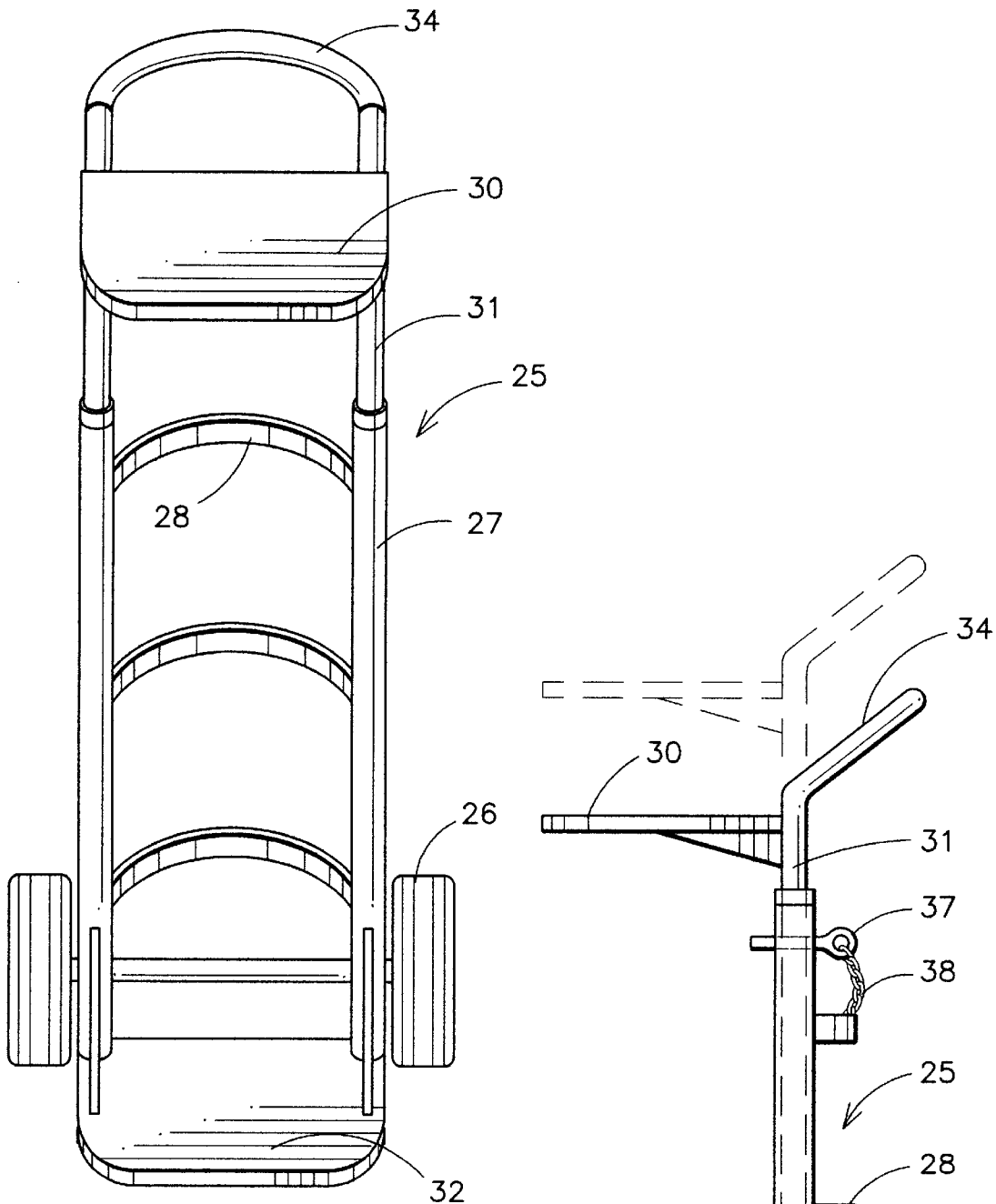
FIG. 4 is a perspective view of the wheeled cart for the liquid dispenser of FIG. 1.

As seen in FIG. 1, the container 11 is mounted to a wheeled cart 25 having a pair of wheels 26 and a rigid framework 27 including back ribs 28 and a raised platform 30. Telescoping frame members 31 allow the upper part of the cart 25 to be telescoped up and down to move the platform 30 between raised positions. In addition, the wheeled cart has a lower platform 32 shaped to hold a second insulated liquid container 33 similar to the container 11 except missing the rigid tube 16 and flexible tubes 20 which can be removed from the container 11 and attached to the container 33 when the container 11 is emptied and a fresh liquid supply is needed. The opening spout 18 allows the manifold 16 to be rapidly attached thereto by strapping or by any other means desired. The cart 25 also has a handle 34, as seen in FIG. 4. FIG. 1 has a user 35, such as a workman, adjacent the portable beverage dispenser 10 holding one of the flexible lines 20 and activating the valve 21 while facing the nozzle into the mouth 36 where he is dispensing the liquid directly into the mouth without touching the nozzle. Since the container 11 is in a raised position, the liquid has a gravity flow through the tube 16 and flexible tubes 20.

Figure 2:
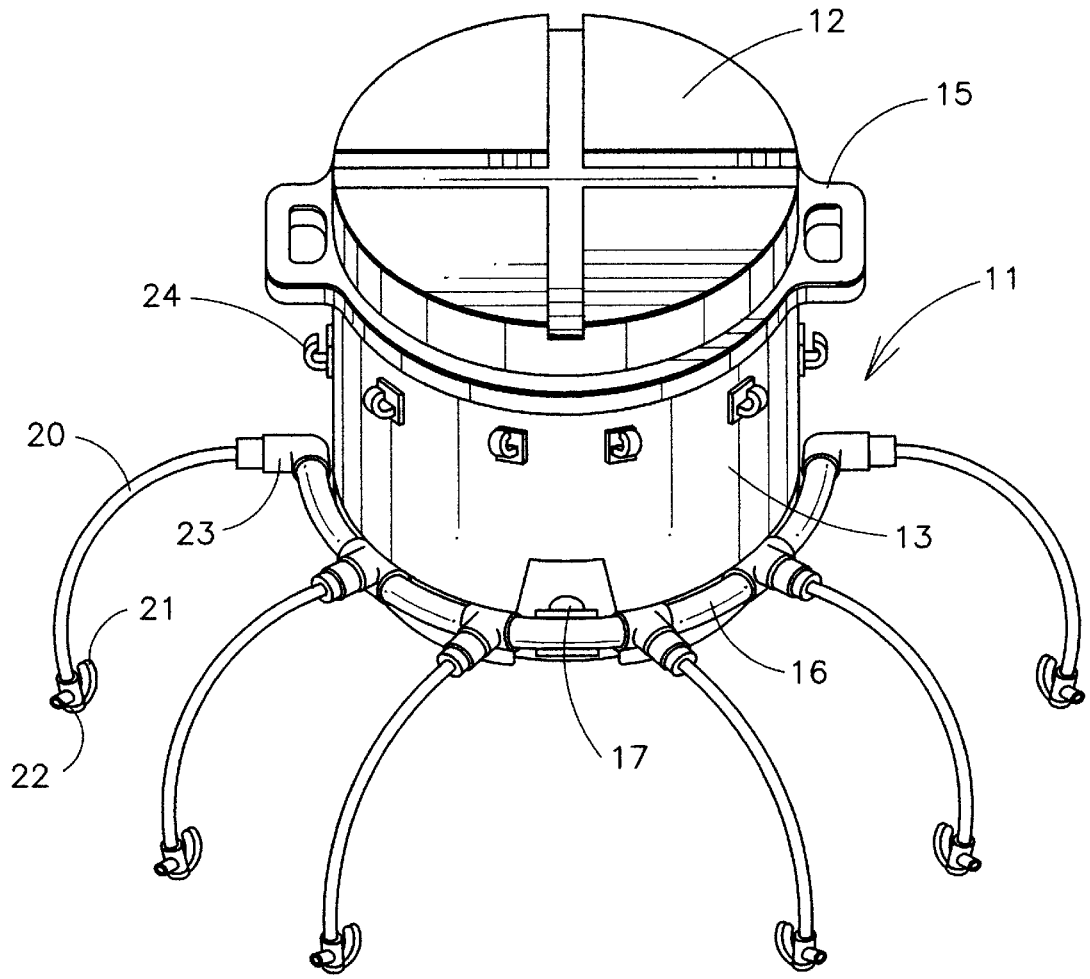
FIG. 2 is a perspective view of a liquid dispensing container of the present invention having dispensing tubes extending therefrom.
Figure 3:
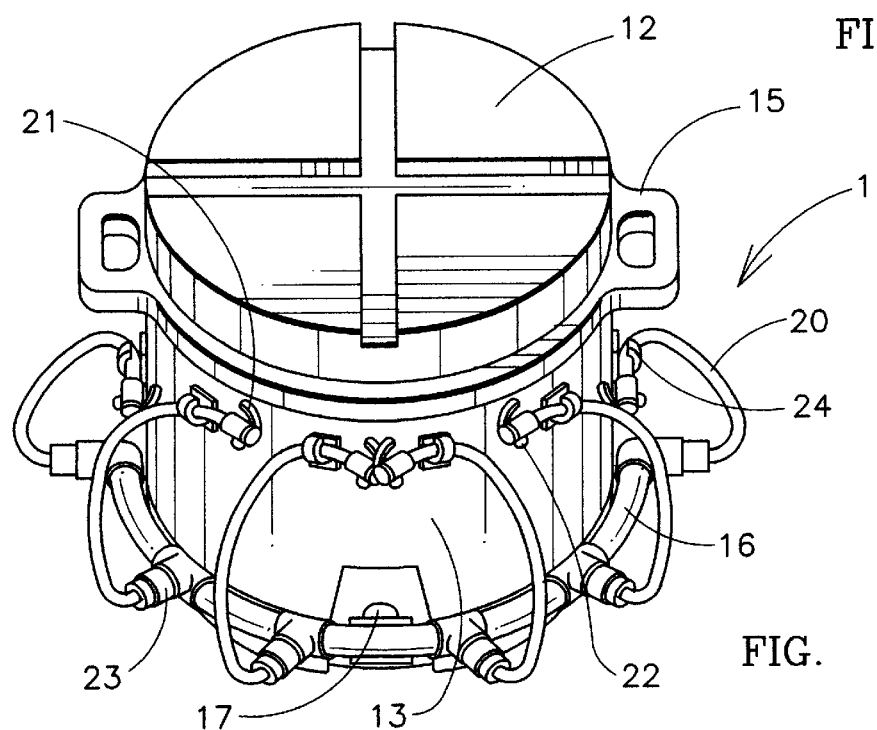
FIG. 3 is a perspective view of the liquid dispensing container of FIG. 2 having the dispensing tubes supported on hooks.

As more clearly seen in FIGS. 2 and 3, the container 11 has the top 12 and handle 15 and has the side of the container 13 having the hooks 24 thereon so that each flexible tube 20 can be raised and attached to one of the hooks 24 shown in FIG. 3. Each flexible tube has the nozzle 22 and valve 21 attached to the end thereof. Each flexible tube is connected through the coupling 23 to the rigid manifold 16. The rigid tube 16 can be strapped to the container or can be permanently affixed to each container, as desired.

Figure 5:
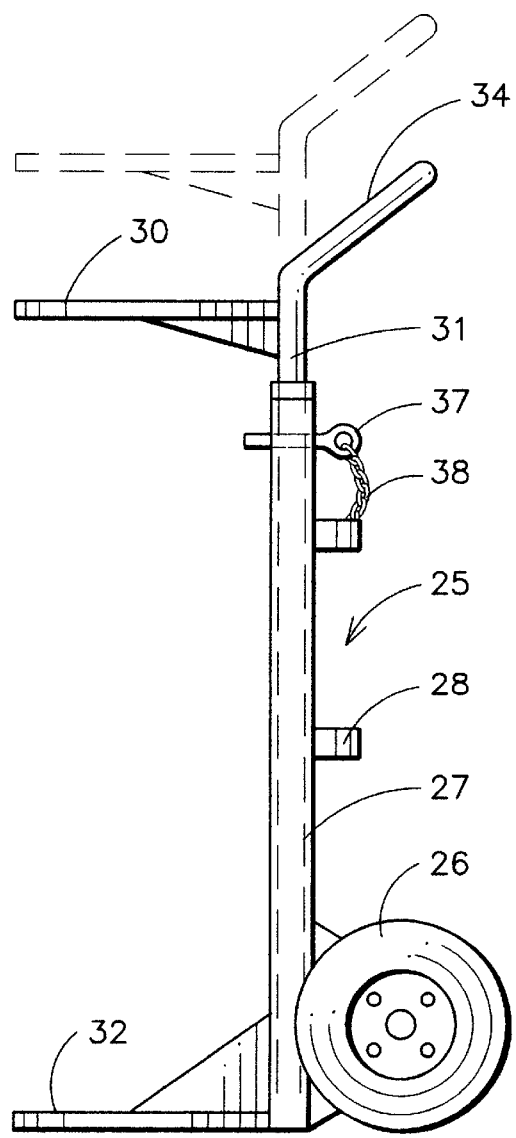
FIG. 5 is a side elevation of the cart of FIG. 4.

FIGS. 4 and 5 more clearly illustrate the wheeled cart 25 having the wheels 26, framework 27 with the telescoping arms 31 supporting the raised platform 30 and allowing for the telescoping of the platform 30 up and down, as illustrated in FIG. 5. The platform can be locked in any positioned desired with a pin 37 attached to a small chain 38. The cart has the cross ribs 28 and the lower platform 32 for carrying a spare liquid container.

It should be clear at this time that a portable liquid dispenser has been provided which provides for a plurality of dispensing flexible tubes which allow a liquid to be dispensed selectively from any one of the tubes by different individuals desiring to obtain water or a liquid beverage. However, it should also be clear that the present invention is not to be construed as limited to the forms shown which are to be considered illustrative rather than restrictive.

I claim:

1. A portable liquid dispenser comprising:

an insulated liquid container has a generally rigid curved manifold mounted thereto and connected to receive liquid from said insulated liquid container, said manifold having a plurality of flexible dispensing tubes extending therefrom each of said plurality of flexible dispensing tubes having a valve thereon for selectively dispensing a liquid from said container; and a wheeled container cart having a container support thereon and having said liquid container removably mounted thereon in a raised position whereby a liquid dispensing container can be wheeled to a selected position for selectively dispensing of a liquid from each of said container flexible dispensing tubes.

2. A portable liquid dispenser in accordance with claim 1 in which said wheeled container cart support has a two container supports thereon, one container support being in a raised position over the other container support.

3. A portable liquid dispenser in accordance with claim 2 in which said wheeled container cart support has two liquid dispensing containers thereon, one removable mounted to each said wheeled container cart support.

4. A portable liquid dispenser in accordance with claim 3 in which said wheeled container cart has two wheels and a handle thereon.

5. A portable liquid dispenser in accordance with claim 4 in which each of said liquid dispensing tubes has a combined nozzle and valve on the end thereof.

6. A portable liquid dispenser in accordance with claim 5 in which said insulated liquid container has an opening therein and said generally rigid curved manifold attached to said opening for liquid to be fed from said container into said manifold.

7. A portable liquid dispenser in accordance with claim 6 in which said insulated liquid container has a pair of handles for lifting said container.

8. A portable liquid dispenser in accordance with claim 7 in which said insulated liquid container has a plurality of hooks thereon, each said hook being shaped to support one flexible tube thereon for supporting said flexible tube when said tube is not being used.

9. A portable liquid dispenser comprising:

an insulated liquid container having an open top, a closed bottom and a side and having a cover covering the open top thereinto, said liquid container having a liquid passageway in the side thereof having a plurality of flexible dispensing tubes extending therefrom;

a generally rigid manifold shaped to fit on the exterior of said insulated liquid container and being attached thereto and having an opening therein operatively connected to said passageway in the side of said insulated liquid container to allow the flow of liquid from said insulated liquid container into said manifold;

a plurality of flexible dispensing tubes, each tube being attached to said generally rigid manifold and extending therefrom and each of said plurality of flexible dispensing tubes having a valve thereon for selectively dispensing a liquid from said insulated liquid container, whereby a liquid in a container can be dispensed through a tube into each of said plurality of flexible dispensing tubes for selectively dispensing a liquid from each said tube;and a wheeled container cart having said insulated liquid container mounted thereto in a raised position whereby a liquid dispensing container can be wheeled to a selected position for selectively dispensing of liquid from each of said container flexible dispensing tubes.

10. A portable liquid dispenser in accordance with claim 9 in which said insulated liquid container has a plurality of hooks thereon, each said hook being shaped to support one flexible tube thereon for supporting said flexible tube when said tube is not being used.

11. A portable liquid dispenser in accordance with claim 10 in which each of said liquid dispensing tubes has a combined nozzle and valve mounted on the end thereof.

\* \* \* \* \*